Oct. 10, 1961  A. E. LA FLEUR  3,003,907
MACHINES FOR MAKING PLASTIC BAGS
Filed Dec. 2, 1957  4 Sheets-Sheet 1

INVENTOR.
Arthur E. LaFleur
BY
Gerald J. Baldwin
Attorney

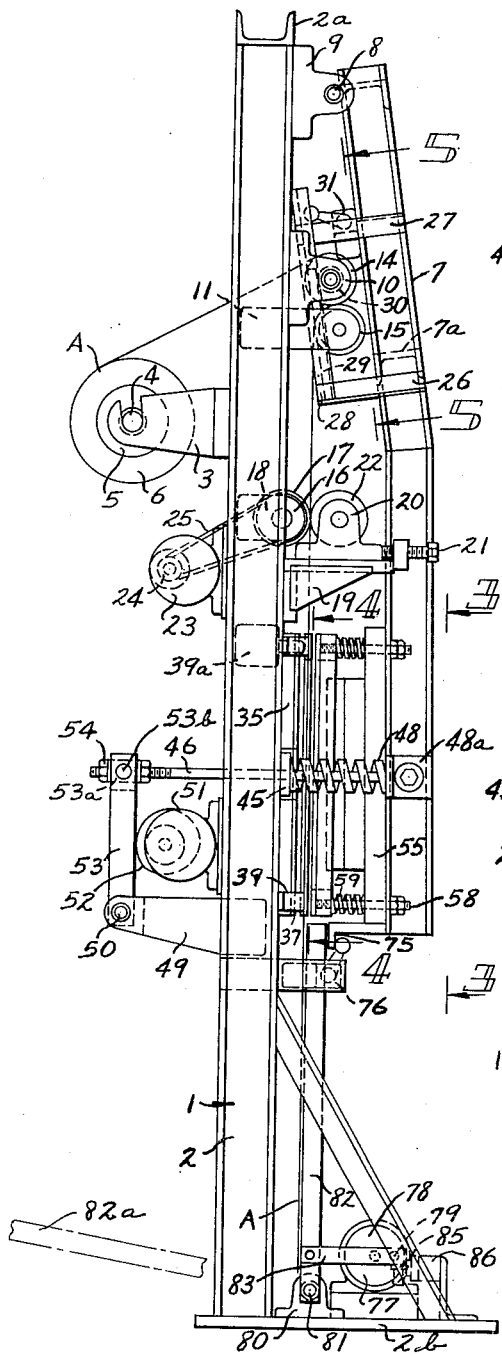

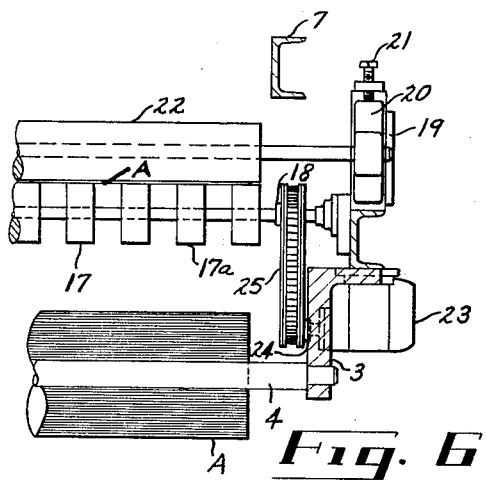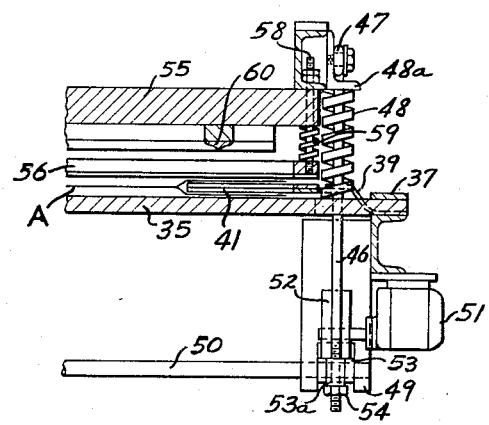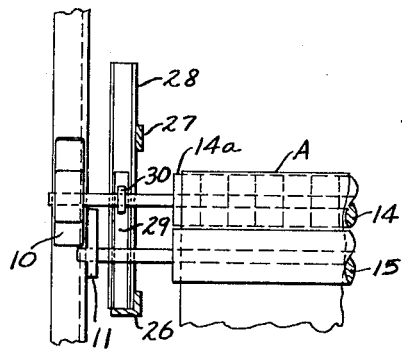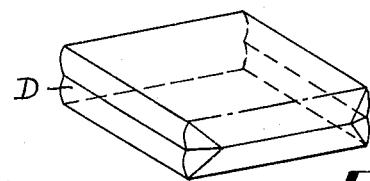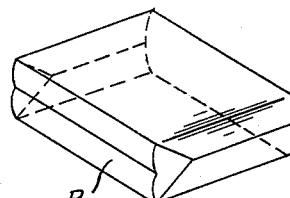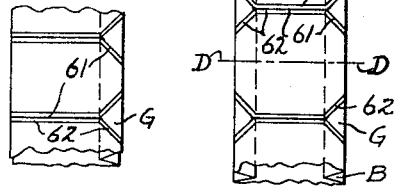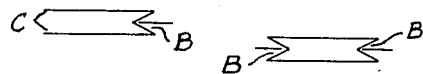

Oct. 10, 1961 — A. E. LA FLEUR — 3,003,907
MACHINES FOR MAKING PLASTIC BAGS
Filed Dec. 2, 1957 — 4 Sheets-Sheet 4

INVENTOR.
Arthur E. LaFleur
BY
Gerald J. Baldwin
Attorney

United States Patent Office 3,003,907
Patented Oct. 10, 1961

3,003,907
MACHINES FOR MAKING PLASTIC BAGS
Arthur E. La Fleur, Clawson, Mich.
(273 River St., Manistee, Mich.)
Filed Dec. 2, 1957, Ser. No. 700,208
5 Claims. (Cl. 156—537)

This invention relates to improvements in machines for making bags of plastic film, and refers particularly to machines for making such bags with flat bottoms.

It is an object of the invention to provide such a machine wherein simple adjustments are arranged whereby the length of bags made by the machine may be changed.

Another object of the invention is to provide such a machine including a bed, a bolster movable relative thereto, and a sealing iron on the bolster by which plastic film extending between the said sealing iron and the bed is adapted to be sealed; wherein a slip sheet extends between the sealing iron and the plastic film through which the latter is sealed; and delayed action means for moving the slip sheet away from the sealed plastic film so that the latter is allowed time to cool somewhat before withdrawal of the said slip sheet therefrom, thus materially reducing the possibility of the sealed film becoming damaged.

A further object of the invention is to provide such a machine including at least one stationary slip sheet between the bed and the bolster adapted to extend along in a gusset formed longitudinally in one side of the plastic film to prevent the adjacent inner faces of the gusset being sealed to one another when separate superimposed seals are simultaneously made between each outer side of the plastic film and the adjacent side of the gusset by a sealing iron.

Figure 1:
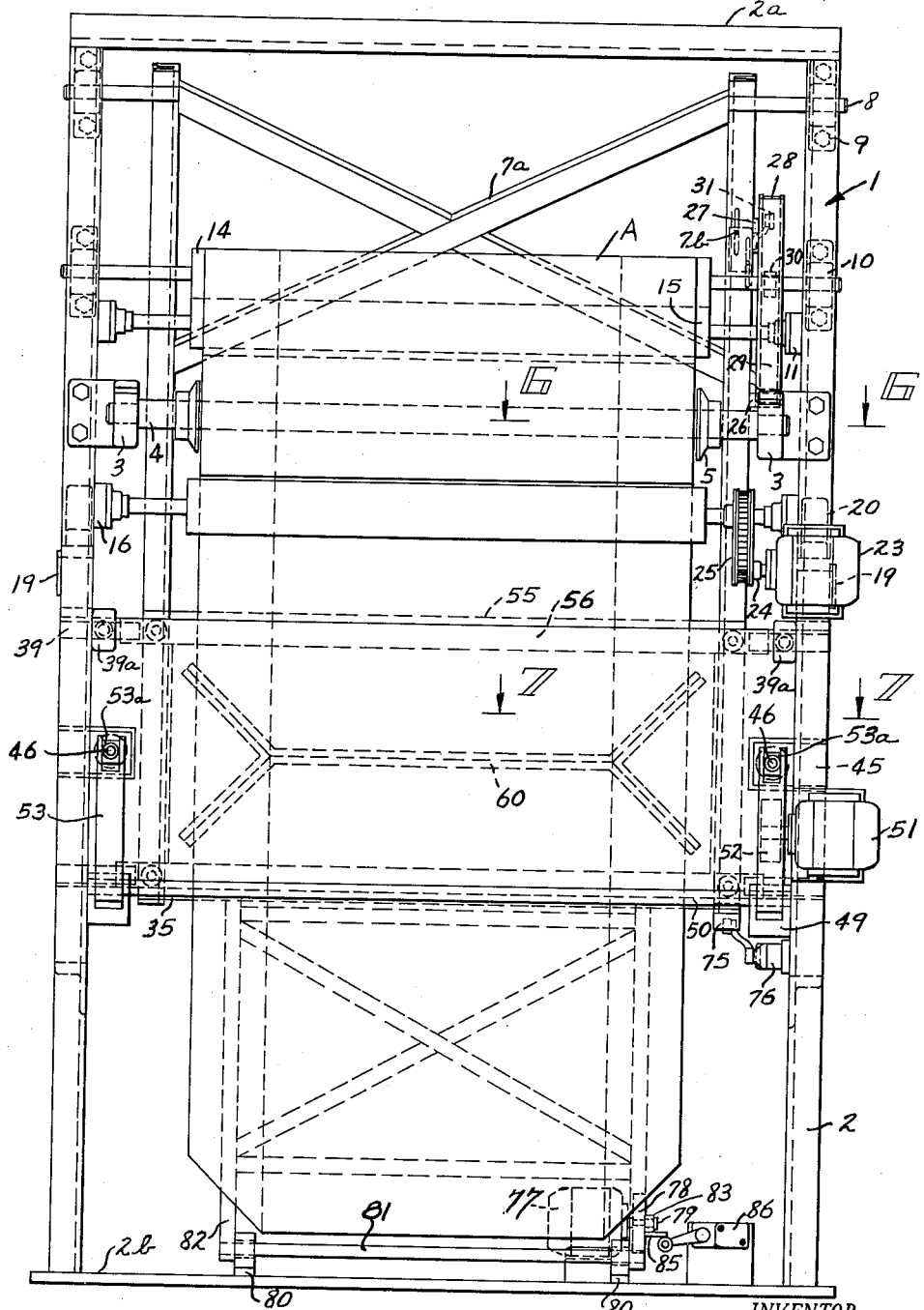
Figure 14:
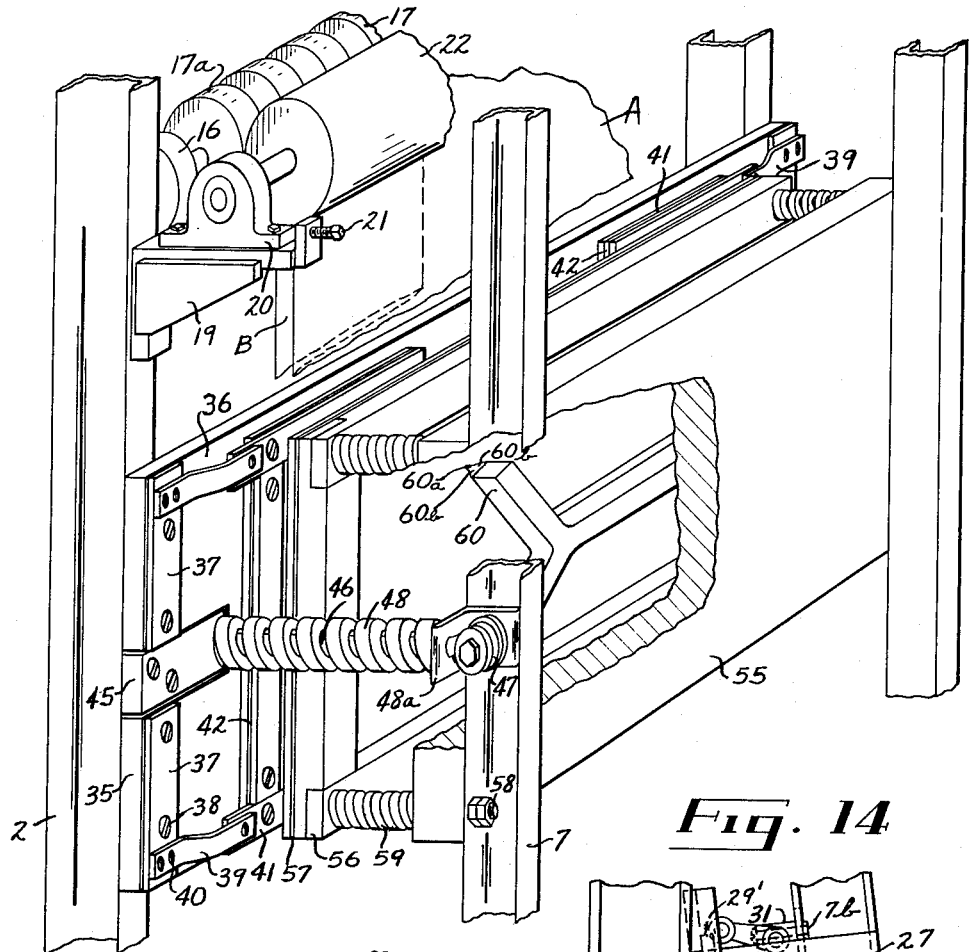
Figure 15:
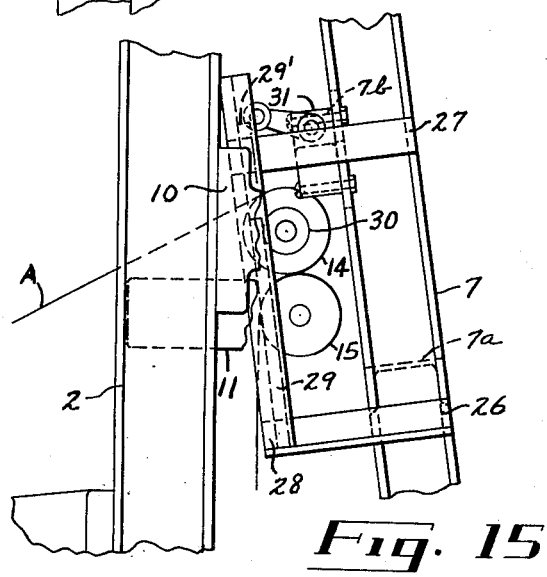
Figure 16:
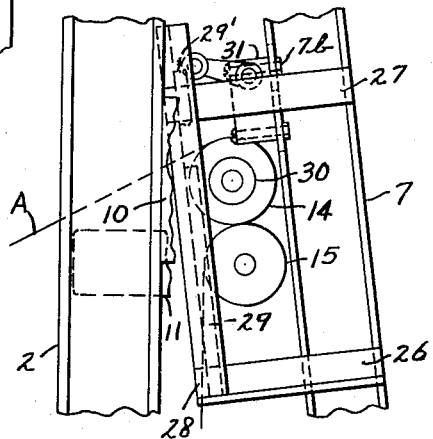

With these and other objects and advantages in view, the invention is hereinafter more fully described with the aid of the accompanying drawings, in which:

FIGURE 1 is a front elevation of the invention, and
FIGURE 2 is a side elevation thereof.
FIGURES 3 and 4 are partial views on the line 3—3 and 4—4 respectively of FIGURE 2.
FIGURE 5 is a partial section on the line 5—5 of FIGURE 2.
FIGURES 6 and 7 are partial sections on the lines 6—6 and 7—7 respectively of FIGURE 1.
FIGURE 8 is a perspective showing a bag made of tubular plastic film having longitudinal gussets in opposite extremities, and
FIGURE 9 is a perspective of a bag made of plastic film folded along one longitudinal margin in which a gusset is formed.
FIGURE 10 is a diagrammatic view of the front of a piece of plastic film of which the bag shown in FIGURE 9 is made, and
FIGURE 11 is an end view thereof.
FIGURE 12 is a diagrammatic view of the front of a piece of plastic film of which the bag shown in FIGURE 8 is made, and
FIGURE 13 is an end view thereof.
FIGURE 14 is an enlarged perspective view of the sealing iron moving mechanism.
FIGURE 15 is an enlarged perspective showing the metering roller and a switch operating mechanism in one position, and
FIGURE 16 is a similar view but with the switch operating mechanism in its other position.
FIGURE 17 is an electrical diagram.

Referring to the drawings, 1 designates a frame resting upon the ground and consisting of two transversely spaced standards 2 held in spaced relation by upper and lower tie members 2a and 2b, respectively. Mounted on the standards 2 are horizontally aligned bearings 3 which support opposite extremities of a shaft 4 having flanges 5 suitably secured thereon to bear against opposite ends of a stock roll 6 having plastic film A wound thereon. Projecting outwardly from opposite sides of a yoke 7 adjacent the upper extremity of the latter are pins 8 which are rotatably mounted in bearings 9 secured to the standards 2. It will also be noted that the yoke is preferably transversely braced at its upper extremity by cross members 7a.

Suitably mounted on the standards 2 are horizontally opposed pairs of bearings 10 and 11 which support opposite extremities of a metering roller 14 and a pressure roller 15, respectively. The roller 14 preferably consists of a plurality of relatively narrow, axially spaced rings 14a. Beneath the rollers 14 and 15 transversely opposed bearings 16 are secured to the standards 2. These bearings support opposite extremities of a feed roller 17 which is also preferably formed of a series of axially spaced rings 17a. Secured to the roller 17 adjacent one extremity is a sprocket 18. Mounted on and projecting from the standards 2 are laterally opposed platforms 19 having bearings 20 mounted thereon for movement parallel to one another and towards and from the stock feed roller 17 as by screws 21. The bearings 20 support opposite extremities of a pressure roller 22. Mounted upon one of the standards 2 is an electric gear motor 23 having a sprocket 24 secured upon its drive shaft. A chain 25 extends around the sprockets 18 and 24. Thus when the motor 23 is set in motion plastic film A is unwound from the stock roller 6, passes between the rollers 14 and 15 and is drawn downward by and between the rollers 17 and 22. It is found that if the rollers 14 and 17 are of uniform diameter throughout their length they have a tendency to crease the plastic film; however if they are made to consist of a plurality of relatively narrow, axially spaced rings 14a and 17a this tendency for the film to crease is eliminated.

Projecting from the yoke 7 opposite the rollers 14 and 15 are substantially vertically spaced supports 26 and 27 to which opposite extremities of a channel-shaped guide 28 are secured; and mounted for axial and substantially vertical movement in the guide 28 is a slide 29. Secured on the roller 14 for rotation therewith is a friction disc 30 preferably made of rubber or other similar material. The periphery of the disc is adapted to move the slide 29 upwardly in the guide 28 as the roller 14 is turned by the plastic film A as it travels from the stock roll 6 between the rollers 14 and 15. Mounted for vertical adjustment on the yoke 7 as by bolts 7b is a limit switch 31 which is adapted to be actuated by the slide 29 when the latter is raised a distance which depends upon the vertical setting of the switch 31. Then operation of the motor 23 ceases and another motor 51 is started. Obviously the higher the switch 31 is positioned the greater the distance the slide 29 must be moved to actuate it, and therefore the greater the length of plastic film which passes down between the rollers 17 and 22 before rotation of the latter is halted.

Beneath the platforms 19 is a bed 35 secured against the vertical faces of the standards 2 adjacent and opposite the yoke 7. Covering the entire face of the bed opposite the yoke is a slip sheet 36 made of glass cloth or other suitable material which may, if desired, be treated to further resist possible adhesion of the plastic film thereto particularly when the latter is hot. Extending vertically across the opposite margins of the slip sheet 36 are straps 37 through which screws 38 in threaded engagement with the standards 2 extend. Projecting inwardly toward one another from the upper and lower margins of the straps 37 to which they are secured as by screws 40 are resilient arms 39 which are rearwardly offset adjacent their free extremities. 41 denotes three-sided and substantially channel-shaped frames secured to the free extremities of the arms 39 and having their open ends extending towards and spaced from one another. These frames 41 and other and similar slip sheets 42 supported by them are in transverse alignment.

Secured to the straps 37 intermediately of their height and projecting inwardly therefrom towards the frame 41 are horizontally opposed guide plates 45 through which rods 46 extend intermediately of their length for axial movement therethrough. One extremity of each rod 46 is provided with an eye 47 for attachment to one side of the yoke 7, and mounted around each rod between its guide plate 45 and eye 47 is a helical spring 48 which tends to thrust the yoke away from the standards 2. The rear extremities of the springs 48 bear against angle plates 48a secured to the yoke 7.

Secured to the standards 2 and substantially in horizontal alignment with the lower extremities of the yoke 7 are opposed brackets 49 which support a shaft 50 adjacent its opposite extremities; and secured to one of the standards above the bracket 49 thereon is an electric gear motor 51 having a cam 52 seccured on its shaft. Pivoted on the shaft 50 and projecting upwardly therefrom are arms 53. Pivotally mounted in the upper extremities of the arms 53 on pins 53b are blocks 53a through which the extremities of the rods 46 remote from the yoke 7 project. Nuts 54 in threaded engagement with the rods are tightened against opposite sides of the blocks 53a. The springs 48 hold the arms 53 so that one of them is retained in engagement with the cam 52 at all times and consequently reciprocation of the yoke towards and from the standards results.

Resting against the side of the yoke 7 adjacent the standards 2 and opposite the bed 35 is a bolster 55. Spaced between the latter and the said bed 35 is a rectangular frame 56 in which a slip sheet 57 is mounted. Extending through opposite sides of the frame 56, the bolster 55 and through the yoke 7 are bolts 58, and mounted around the latter between the frame 56 and the bolster are helical springs 59 which tend to hold the said frame against the transversely aligned channel-shaped frames 41. Suitably secured upon and insulated from the side of the bolster 55 adjacent the bed 35 and opposite the bed 35 is a conventional electrically heated sealing iron 60 of the type having a severing edge 60a formed along its longitudinal margin to contact the plastic film and part the latter transversely of its length at 61, FIGURES 10 and 12. On opposite sides of the severing edge outwardly flared flanges 60b are formed from which sufficient heat is radiated to form seals across the film. The ends of the sealing iron extending over the gussets each seal one outer side of the folded plastic film to the adjacent and opposite portion of the gusset so that separate seals are formed on opposite sides of the slip sheet 42.

The plastic film A in its original roll may be of different cross sectional forms. FIGURES 12 and 13 show a tubular form wherein gussets B extend along opposite longitudinal margins, and in the film shown in FIGURES 10 and 11 a single gusset B extends along one margin and the film terminates along its opposite margin in separated aligned edges C. In the event that the plastic is of tubular section a container as shown between two opposed seals 62 in FIGURE 12 is formed which is closed along all four sides and to produce bags as shown in FIGURE 8 each container must then be cut transversely across the line indicated at D. In the event that the plastic film is of the cross sectional form shown in FIGURES 10 and 11 the aligned edges C remain open to form the mouths of bags as indicated at C' in FIGURE 9. Then the Y-shaped end at one extremity of the sealing iron is dispensed with.

During operation of the motor 23 the film A is moved downward between the slip sheet 36 on the bed 35 and the similar sheet 57 on the rectangular frame 56. If the plastic film is tubular as shown in FIGURES 12 and 13 and has gussets B along its opposite margins the opposed frames 41 are so spaced that the slip sheets 42 extend into the gussets for the entire depth of the latter. If the plastic film has a gusset along one margin only, as in FIGURES 10 and 11, then only a single frame 41 is used and its slip sheet 42 extends into the gusset. In order to prevent adhesion of the plastic film A to the channel-shaped frames 41 by which movement of the film would be impeded, a vibrator 39a is mounted on each standard to apply strokes in rapid succession against the said frames.

When operation of the motor 51 commences it makes one complete revolution and then a trip 75 operates a limit switch 76; then the motor 51 stops and the motor 77 is actuated. Secured on the shaft of the motor 77 is a disc 78 having an eccentric pin 79 projecting therefrom. Supported towards opposite sides of the base of the frame 1 are bearings 80 in which a shaft 81 is mounted. Upon the shaft 81 opposite sides of the lower extremity of a stacker frame 82 are pivotally mounted. Pivotally secured at one extremity to the eccentric pin 79 and at its opposite extremity to the frame 82 adjacent its pivot mounting is a link 83 through which the stacker frame is adapted to be moved from its substantially vertical position shown to its position indicated at 82a. After the sealing iron 60 has severed the bottom portion of the plastic film beneath it the latter bears against the frame 82 by which it is swung downwardly and outwardly onto a pile, not shown, located beneath the stacker frame when the latter is in its position 82a. Though the bottom portion of the film has been to all intents and purposes severed by the sealing iron it does not usually break away from the plastic film above it until engaged by the stacker frame at which time also the triangular severed portions G of the plastic film indicated in FIGURES 10 and 12 usually break away. As the stacker frame reassumes its substantially vertical position shown a trip 85 actuates a limit switch 86 by which the motor 77 is stopped and the motor 23 is started.

It will be noted that due to the arrangement of the slip sheet 57 and the mounting of the frame 56, the springs 59 allow the slip sheet to remain for a short period in engagement with the sealed film after sealing has occurred and as the bolster 55 commences to move away from the bed 35. This interval is sufficient to allow the sealed film to cool somewhat before the slip sheet is moved away from it by the springs, and helps materially in preventing the sealed plastic film being damaged.

Referring now to the wiring diagram shown in FIGURE 17 which illustrates one way of operating the motors 23, 51 and 77 in sequence. When the starter switch 100 is closed a circuit is made through the circuit relay 101, and with the switch 31 closed the motor 23 is operated through the circuit relays 103 and 104. When the switch 31 is opened by the slide 29 the circuit relay 103 is deenergized and the circuit relays 105 and 106 are energized thereby starting the motor 51. Upon completion of one revolution of the motor 51 the switch 76 is actuated by the trip 75 thereby deenergizing the circuit relays 104 and 105 and stopping the motor. When the switch 76 is tripped it also closes a circuit through the circuit relays 107 and 108 and starts the motor 77. When the latter has turned through one revolution the trip 85 actuates the switch 86 thereby deenergizing the circuit relays 106, 107 and 108 and energizing the circuit relay 109 by which the circuit is reset. By opening the manually operable cut-out switch 102 the circuit may be broken at any time.

While in the foregoing the preferred embodiment of the invention has been described and shown it is understood that alterations and modifications may be made thereto, provided the said alterations and modifications fall within the scope of the appended claims.

What I claim is:

1. A machine for making bags of plastic film comprising a frame, rollers mounted thereon between which plastic film folded longitudinally upon itself to form a gusset between its opposite sides is adapted to be fed, means for intermittently rotating the rollers, a bed secured on the frame, a bolster mounted on the frame for movement towards and from the bed, means for reciprocating the bolster when the rollers are stationary, said plastic film being adapted to pass from the rollers between the bed and the bolster, a sealing iron secured to the bolster to engage the plastic film between the sealing iron and the bed, and a stationary slip sheet supported along on longitudinal margin between the bed and the bolster to project into the gusset, said sealing iron being adapted to simultaneously seal the outer sides of the plastic film on opposite sides of the slip sheet each to the side of the gusset adjacent thereto.

2. A machine for making bags of plastic film comprising a vertical frame, rollers mounted thereon between which plastic film folded longitudinally upon itself to form a gusset between its opposite sides is adapted to be fed, means for intermittently rotating the rollers, a vertical bed secured on the frame, a bolster pivotally mounted on the frame for reciprocation towards and from the bed, means for reciprocating the bolster when the rollers are stationary, said film being adapted to hang between the bed and the bolster, a sealing iron secured transversely on the bolster to engage the plastic film between it and the bed, a stationary slip sheet supported between the bed and the bolster to project into the gusset, and said sealing iron being adapted to simultaneously seal the outer sides of the plastic film on opposite sides of the slip sheet each to the adjacent side of the gusset and the ungussetted folded portions of the plastic film to one another.

3. The combination in claim 2, wherein the portion of the sealing iron opposite the slip sheet is angularly disposed to the remainder thereof.

4. The combination in claim 2, wherein the portion of the sealing iron opposite the slip sheet is in the form of an outwardly and laterally disposed V.

5. A machine for making bags of plastic film comprising a frame, rollers mounted thereon between which plastic film folded upon itself along its longitudinal margins to form gussets between its opposite sides is adapted to be fed, means for intermittently rotating the rollers, a bed secured on the frame, a bolster mounted on the frame for reciprocation towards and from the bed, means for reciprocating the bolster when the rollers are stationary, said plastic film being adapted to pass from the rollers between the bed and the bolster, a sealing iron having a laterally disposed V at each extremity mounted transversely on the bolster to engage the plastic film between it and the bed, and stationary slip sheets supported between the bolster and the bed each to project into one of the gussets, the V-shaped extremities of the sealing iron being adapted to simultaneously seal the outer sides of the plastic film on opposite sides of the slip sheets to the adjacent sides of the gussets and the intermediate portion of the sealing iron to seal the ungussetted portions of the opposite sides of the plastic film to one another.

References Cited in the file of this patent

UNITED STATES PATENTS

| | | |
|---|---|---|
| 2,256,506 | Wagner | Sept. 23, 1941 |
| 2,652,879 | Keller et al. | Sept. 22, 1953 |
| 2,707,985 | Binnall | May 10, 1955 |
| 2,768,673 | Gaubert et al. | Oct. 30, 1956 |
| 2,830,506 | Burroughs | Apr. 15, 1958 |
| 2,832,271 | Jarund | Apr. 29, 1958 |

FOREIGN PATENTS

| | | |
|---|---|---|
| 462,899 | Canada | Jan. 31, 1950 |